United States Patent
Lee et al.

(10) Patent No.: US 7,056,753 B2
(45) Date of Patent: Jun. 6, 2006

(54) FIELD EMISSION DISPLAY WITH DOUBLE GATE STRUCTURE AND METHOD OF MANUFACTURING THEREFOR

(75) Inventors: Hang-woo Lee, Gyeonggi-do (KR); Pil-soo Ahn, Gyeonggi-do (KR); Andrei Zoulkarneev, Gyeonggi-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 28 days.

(21) Appl. No.: 10/755,348

(22) Filed: Jan. 13, 2004

(65) Prior Publication Data

US 2004/0140489 A1  Jul. 22, 2004

(30) Foreign Application Priority Data

Jan. 13, 2003  (KR) .................. 10-2003-0002093

(51) Int. Cl.
*H01L 21/00* (2006.01)
(52) U.S. Cl. .................. 438/20; 438/22; 257/10; 257/11; 257/144
(58) Field of Classification Search .............. 438/20, 438/22, 34, 978, 800; 257/49, 340; 216/13, 216/38, 58, 80; 445/50, 24; 313/351, 512, 313/336; 315/351
See application file for complete search history.

(56) References Cited

U.S. PATENT DOCUMENTS

| | | | | |
|---|---|---|---|---|
| 5,012,153 A | * | 4/1991 | Atkinson et al. | ............ 313/336 |
| 5,813,892 A | * | 9/1998 | Spindt et al. | .................. 445/24 |
| 5,986,388 A | * | 11/1999 | Makishima | .................. 313/309 |
| 6,045,426 A | * | 4/2000 | Wang et al. | .................... 445/24 |
| 6,538,367 B1 | * | 3/2003 | Choi et al. | .................... 313/309 |
| 6,780,663 B1 | * | 8/2004 | Park et al. | ...................... 438/52 |
| 6,819,041 B1 | * | 11/2004 | Kajiwara | ..................... 313/496 |
| 6,876,146 B1 | * | 4/2005 | Yano et al. | .................. 313/506 |

FOREIGN PATENT DOCUMENTS

| | | |
|---|---|---|
| JP | 7-29484 | 1/1995 |
| JP | 2002-373570 | 12/2002 |

OTHER PUBLICATIONS

Korean Patent Official Action and English Translation dated Jan. 27, 2005.

* cited by examiner

*Primary Examiner*—Long Pham
*Assistant Examiner*—Thao X. Le
(74) *Attorney, Agent, or Firm*—Buchanan Ingersoll PC

(57) ABSTRACT

A field emission display with a double gate structure and a method of manufacturing therefor are provided. The field emission display includes a substrate, a cathode layer formed on the substrate, a gate insulating layer which is formed on the substrate and the cathode layer and has a cavity through which part of the cathode layer is exposed, a field emitter provided on the cathode layer exposed on the bottom of the cavity, a first gate layer which is formed in the gate insulating layer and in which a first gate hole having a diameter greater than that of the cavity is formed not to be exposed to an inner surface of the cavity, and a second gate layer which is formed on the gate insulating layer and in which a second gate hole is formed in a portion that corresponds to the cavity.

20 Claims, 6 Drawing Sheets

FIELD EMISSION DISPLAY WITH DOUBLE GATE STRUCTURE AND METHOD OF MANUFACTURING THEREFOR

BACKGROUND OF THE INVENTION

This application claims the priority of Korean Patent Application No. 2003-2093, filed on Jan. 13, 2003, in the Korean Intellectual Property Office, the disclosure of which is incorporated herein in its entirety by reference.

1. Field of the Invention

The present invention relates to a field emission display (FED) with a double gate structure and a method of manufacturing thereof, and more particularly, to a field emission display (FED) in which short circuit between an emitter and a double gate can be prevented, and a method of manufacturing thereof.

2. Description of the Related Art

Displays, which are an important part of conventional information transmission media, include PC monitors and televisions (TVs). Displays are classified into cathode ray tubes (CRTs) using high-speed thermal electron emission and flat panel displays that have been recently developed at a very high speed. Flat panel displays include liquid crystal displays (LCDs), plasma display panels (PDPs), and field emission displays (FEDs).

Field emission displays (FEDs) apply a strong electric field from a gate to a field emitter disposed on a cathode layer at regular intervals, thereby emitting electrons from the field emitter, colliding the electrons with a phosphor material of an anode layer, and emitting light. In the prior art, a micro-tip formed of metal, such as molybdenum (Mo), is used as a field emitter for FEDs. However, recently, carbon nanotubes are widely being used as the field emitter for FEDs. Since FEDs using carbon nanotubes (CNTs) have the advantages of a wide range of vision, high resolution, low power, and temperature stability, FEDs has a variety of applications such as a car navigation device and a viewfinder for an electronic display. In particular, FEDs can be used as a replacement for other types of displays for PCs, personal data assistant (PDA) terminals, medical equipment, and a high definition televisions (HDTVs).

Two structures of conventional field emission displays (FEDs) are shown in FIGS. 1 and 2. Referring to FIG. 1, a conventional FED includes a substrate 10, a cathode layer 11, a first insulating layer 12, a first gate layer 13, a second insulating layer 14, and a second gate layer 15, which are sequentially stacked on the substrate 10. A cavity 17 having a predetermined diameter is formed on the first and second insulating layers 12 and 14, respectively. A first gate hole 13a and a second gate hole 15a which correspond to the cavity 17, are formed in the first and second gate layers 13 and 15, respectively. A field emitter 19 is provided on the cathode layer 11 exposed through the cavity 17. Here, a glass substrate is widely used as the substrate 10, and the cathode layer 11 is formed of indium tin oxide (ITO) which is a transparent conductive material. The field emitter 19 is formed of carbon nanotubes or a metal tip, as described above.

A conventional FED shown in FIG. 2 includes a substrate 20, a cathode layer 21, a first insulating layer 22, a first gate layer 23, a second insulating layer 24, and a second gate layer 25, which are sequentially stacked on the substrate 20. A first cavity 27 and a first gate hole 23a having the same diameter are formed in the first insulating layer 22 and the first gate layer 23, respectively. A second cavity 28 and a second gate hole 25a having a diameter greater than the diameter of the first cavity 27 are formed in the second insulating layer 24 and the second gate layer 25, respectively. Carbon nanotubes (CNTs) or a metal tip are used for a field emitter 29 in the first cavity 27.

As shown in FIGS. 1 and 2, the FEDs with a double gate structure control voltages applied to the second gate layers 15 and 25, and thus prevent divergence of electron beams emitted from the field emitters 19 and 29. As such, the electron beams are focused as beam spots having a smaller size at a desired position of an anode layer. Thus, more clear picture quality can be achieved. Also, in these aforementioned FEDs, an electrical arc which may occur between the FEDs and the anode layer, can be discharged through the second gate layers 15 and 25 closer to the anode layer. Thus, the electrical arc does not directly affect the field emitters 19 and 29 which serve to emit electron beams, the cathode layers 11 and 21, and the first gate layers 13 and 23.

In particular, the FED shown in FIG. 1 has the narrower and deeper cavity 17 and gate holes 13a and 15a, and thus has the advantage of a higher focusing characteristic of electron beams emitted from the field emitter 19. The FED shown in FIG. 2 has the wider second cavity 28 and second gate hole 25a, and thus can be more easily manufactured.

However, in the conventional FEDs shown in FIGS. 1 and 2, short circuit often occurs between the first gate layers 13 and 23 and the field emitters 19 and 29 and between the first gate layers 13 and 23 and the second gate layers 15 and 25. This is because the first gate layers 13 and 23 to which comparatively high voltages are applied are exposed outside of the insulating layers 12, 14, 22, and 24 and intervals between the first gate layers 13 and 23, the field emitters 19 and 29, and the second gate layers 15 and 25 are narrow. In this case, the danger of line breakage on a screen occurs, and the FED and a driving circuit are damaged by overcurrent caused by short circuit, and thus their life spans are shortened.

FIG. 3 illustrates the result of simulation performed on electron beam emission in the conventional FED having the structure shown in FIG. 1. In this simulation, a voltage of 30V is applied to the first gate layer 13, and a voltage of 10V is applied to the second gate layer 15. In FIG. 3, a portion of a strong electric field is marked by a red color.

Referring to FIG. 3, in the prior art, the first gate layer 13 is exposed outside of the insulating layers 12 and 14, and thus, a very strong electric field is focused on an exposed portion of the first gate layer 13. In this case, short circuit may easily occur between the field emitter 19 and the first gate layer 13. In addition, electrons emitted from the field emitter 19 are collided with the exposed portion of the first gate layer 13. As a result, the portion is damaged, and the stability of the FED is lowered.

SUMMARY OF THE INVENTION

The present invention provides a field emission display (FED) in which short circuit between an emitter and a double gate can be prevented.

The present invention also provides a method of manufacturing the FED having the above structure.

According to one aspect of the present invention, there is provided a field emission display. The field emission display includes a substrate, a cathode layer formed on the substrate, a gate insulating layer which is formed on the substrate and the cathode layer and has a cavity through which part of the cathode layer is exposed, a field emitter provided on the cathode layer exposed on the bottom of the cavity, a first gate layer which is formed in the gate insulating layer and in which a first gate hole having a diameter greater than that of the cavity is formed not to be exposed to an inner surface of the cavity, and a second gate layer which is formed on the gate insulating layer and in which a second gate hole is formed in a portion that corresponds to the cavity.

Preferably, the gate insulating layer includes two insulating layers, and the first gate layer is formed between the two insulating layers.

Preferably, the diameter of the second gate hole is greater than that of the cavity, and more preferably, the diameter of the second gate hole is substantially the same as that of the first gate hole.

Meanwhile, a metal tip may be used for the field emitter, but preferably, the field emitter is formed of carbon nanotubes.

According to another aspect of the present invention, there is provided a method of manufacturing a field emission display. The method comprises (a) forming a transparent cathode layer on a transparent substrate, (b) forming a first insulating layer on the substrate and the cathode layer, (c) forming a first gate layer having a first gate hole on the first insulating layer, (d) forming a second insulating layer on the first insulating layer and the first gate layer, (e) forming a second gate layer having a second gate hole having a diameter smaller than that of the first gate hole on the second insulating layer, (f) etching the second insulating layer exposed through the second gate hole and the first insulating layer under the second insulating layer and forming a cavity through which part of the cathode layer is exposed, (g) patterning the second gate layer as a predetermined shape, and (h) forming a field emitter on the cathode layer exposed to the bottom of the cavity.

In the present invention, the first and second insulating layers may be formed by a thick film process of coating an insulating material in a paste state by screen printing and plasticizing the insulating material, or by a thin film process using chemical vapor deposition (CVD).

Preferably, (c) comprises depositing a conductive metal material on the first insulating layer and forming the first gate layer, and patterning the first gate layer as a predetermined shape and forming a first gate hole having a diameter greater than that of the cavity.

Preferably, (e) comprises depositing a conductive metal material on the second insulating layer and forming the second gate layer, and forming the second gate hole to the same diameter as that of the cavity on the second gate layer.

Preferably, in (f), the second insulating layer and the first insulating layer are etched using the second gate layer as an etch mask, thereby forming the cavity to substantially the same diameter as that of the second gate hole.

Preferably, in (g), the diameter of the second gate hole is enlarged to be greater than that of the cavity, and in particular, the diameter of the second gate hole is enlarged to be substantially the same as that of the first gate hole.

In the present invention, (h) comprises coating a photoresist on the entire surface of the substrate and patterning the photoresist so that part of the cathode layer is exposed to the bottom surface of the cavity, coating a carbon nanotube (CNT) paste with photosensitivity on the entire surface of the substrate on which the photoresist is coated, selectively exposing the CNT paste by radiating ultraviolet (UV) rays on the rear side of the substrate, removing the photoresist using a developing agent and lifting off an unexposed portion of the CNT paste, and plasticizing the remaining the CNT paste and forming a carbon nanotube (CNT) emitter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects and advantages of the present invention will become more apparent by describing in detail preferred embodiments thereof with reference to the attached drawings in which.

DETAILED DESCRIPTION OF THE INVENTION

Hereinafter, preferred embodiments of a field emission display (FED) with a double gate structure according to the present invention will be described in detail with reference to the accompanying drawings.

Figure 4:
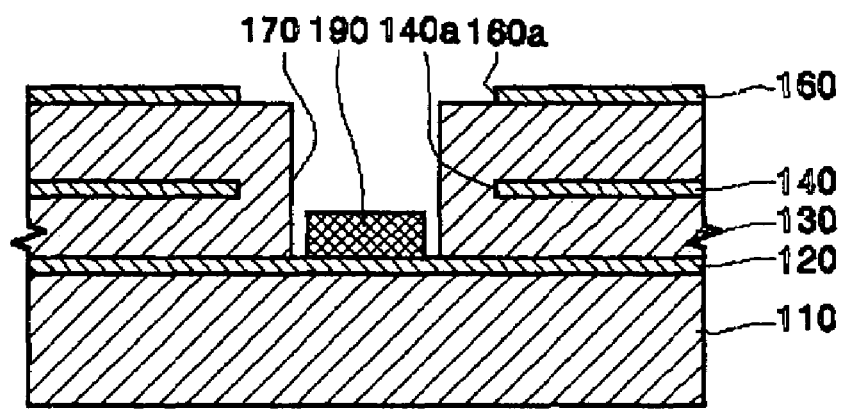
FIG. 4 is a cross-sectional view illustrating the structure of a field emission display (FED) according to an embodiment of the present invention.
Figure 5:
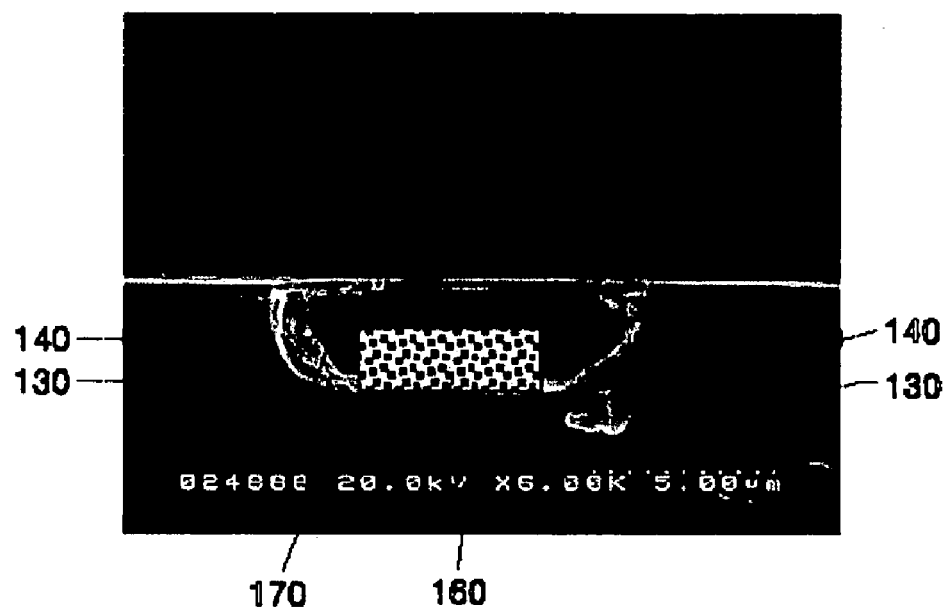
FIG. 5 is an SEM photo taken a section of the FED shown in FIG. 4.

FIG. 4 is a cross-sectional view illustrating the structure of a field emission display (FED) according to an embodiment of the present invention, and FIG. 5 is an SEM photo taken a section of the FED shown in FIG. 4.

Referring to FIGS. 4 and 5, the field emission display (FED) includes a substrate 110, a cathode layer 120 formed on the substrate 110, a gate insulating layer 130 formed on the cathode layer 20, a first gate layer 140 provided in the gate insulating layer 130, and a second gate layer 160 formed on the gate insulating layer 130.

A glass substrate is generally used as the substrate 110, and the cathode layer 120 may be formed of indium tin oxide (ITO) which is a transparent conductive material.

The gate insulating layer 130 has a cavity 170 having a predetermined diameter through which part of the cathode layer 120 is exposed, and a field emitter 190 is provided on the cathode layer 120 exposed to the bottom of the cavity 170.

A micro-tip formed of metal such as molybdenum (Mo), may be used as the field emitter 190. However, preferably, carbon nanotubes (CNTs) having the advantages of a wide range of vision, high resolution, low power, and temperature stability described above may be used as the field emitter 190.

The first gate layer 140 is provided in the gate insulating layer 130 as described above. Specifically, the gate insulating layer 130 is formed of two insulating layers, which will be described in a subsequent manufacturing process. The first gate layer 140 is provided between the two insulating layers. Also, a first gate hole 140a having a diameter greater than the diameter of the cavity 170 is formed in the first gate layer 140. That is, a material used to form the gate insulating layer 130 is interposed between an inner surface of the first gate hole 140a of the first gate layer 140 and an inner surface of the cavity 170. Thus, the first gate layer 140 is not exposed to the inner surface of the cavity 170.

In the field emission display (FED) according to the present invention, the first gate layer 140 may be more securely insulated from the second gate layer 160 and the field emitter 190, respectively, by the gate insulating layer 130 which surrounds the first gate layer 140. Thus, short circuit which may occur between the first gate layer 140 and the second gate layer 160 and between the first gate layer 140 and the field emitter 190, can be prevented in advance. As such, defects of the FED caused by short circuit are suppressed, and the life span of the FED is increased.

The second gate layer 160 is formed on the gate insulating layer 130 and has a second gate hole 160a formed in a portion which corresponds to the cavity 170. The diameter of the second gate hole 160a may be the same as that of the cavity 170, but preferably, greater than that of the cavity 170. In particular, more preferably, the diameter of the second gate hole 160a is substantially the same as that of the first gate hole 140a.

If the diameter of the second gate hole 160a is the same as that of the cavity 170 or smaller than that of the first gate hole 140a, the second gate layer 160 is closer to the cavity 170 than in the first gate layer 140. In this case, a focusing characteristic of electron beams caused by the second gate layer 160 is improved. On the other hand, control of electron beam emission caused by the first gate layer 140 becomes difficult, and thus, an emission characteristic of electron beams from the field emitter 190 is lowered.

To the contrary, if the diameter of the second gate hole 160a is greater than that of the first gate hole 140a, control of electron beam emission caused by the first gate layer 140 can be more effectively performed, but a focusing characteristic of electron beams caused by the second gate layer 160 is lowered.

Thus, as described above, preferably, the diameter of the second gate hole 160a is the same as that of the first gate hole 140a because an electron beam emission characteristic and a focusing characteristic of electron beams can be balanced.

Figure 6:
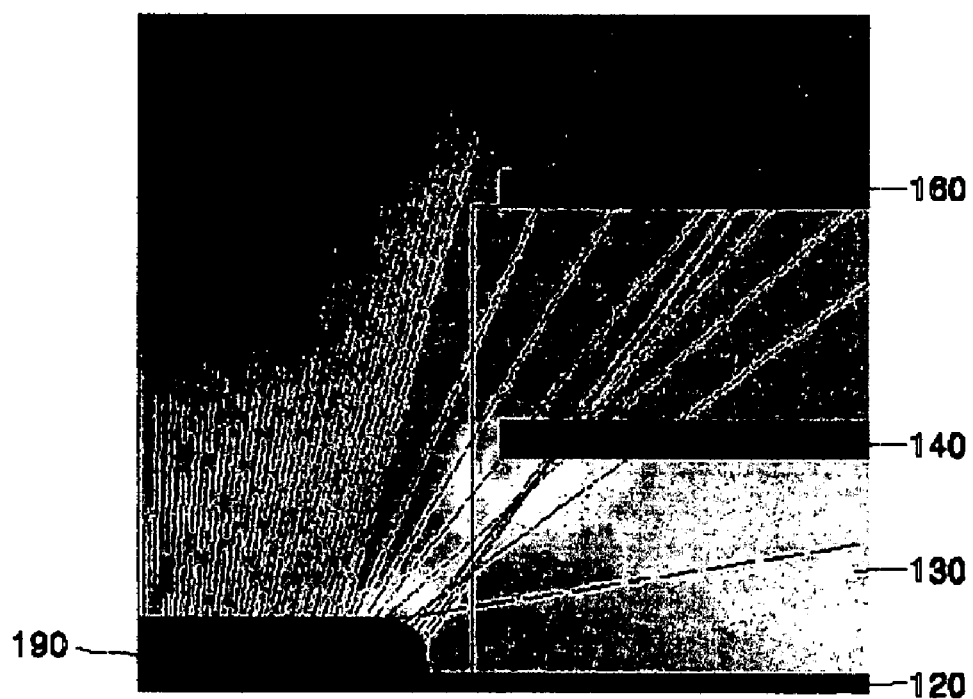
FIG. 6 illustrates the result of simulation performed on electron beam emission in the FED shown in FIG. 4, according to the present invention.

FIG. 6 illustrates the result of simulation performed on electron beam emission in the FED shown in FIG. 4, according to the present invention. This simulation is performed under conditions of FIG. 3. That is, a voltage of 30V is applied to the first gate layer 140, and a voltage of 10V is applied to the second gate layer 160. In FIG. 6, a portion of a strong electric field is marked by a red color.

Figure 1:
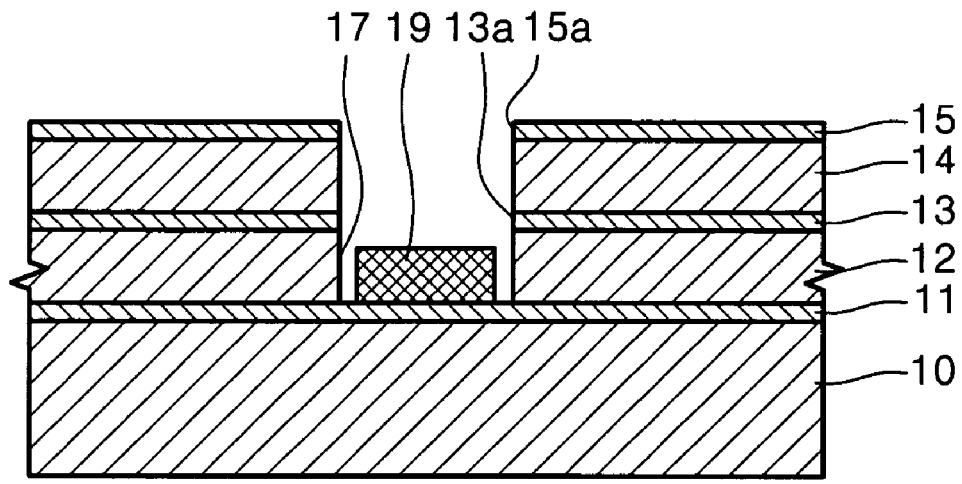
FIG. 1 is a cross-sectional view illustrating an example of a conventional field emission display (FED)
Figure 2:
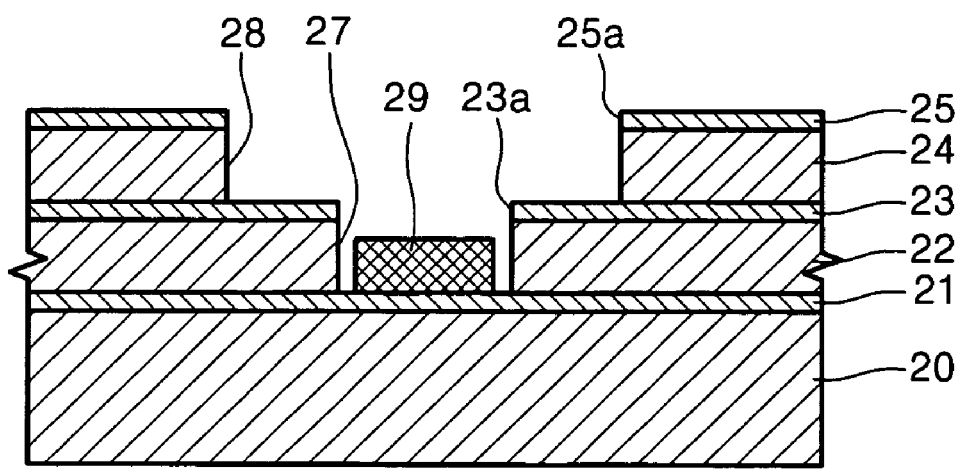
FIG. 2 is a cross-sectional view illustrating another example of a conventional FED.
Figure 3:
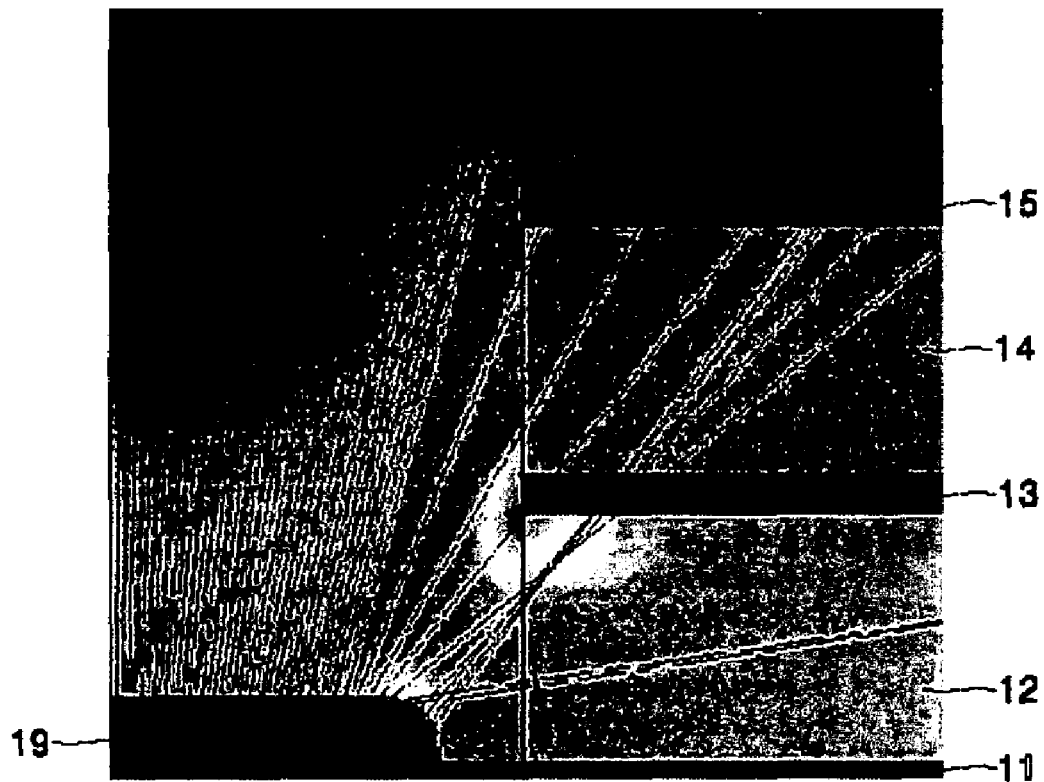
FIG. 3 illustrates the result of simulation performed on electron beam emission in the conventional FED having the structure shown in FIG. 1.

Referring to FIG. 6, the first gate layer 140 is surrounded by the gate insulating layer 130 and is not exposed outside, and thus, the strength of an electric field formed on an inner surface of the first gate layer 140 is reduced than in FIG. 3. Also, the first gate layer 140 can be protected from electrons emitted from the field emitter 190 by the gate insulating layer 130. Thus, short circuit between the first gate layer 140 and the field emitter 190 can be prevented, and the stability of the FED can be improved.

Hereinafter, a method of manufacturing a field emission display (FED) according to the present invention will be described with reference to the accompanying drawings.

First, the field emission display (FED) can be manufactured using a thick film process or a thin film process. The thick film process is a process by which an insulating material in a paste state is coated by screen printing and first and second insulating layers which will be described later, are formed to be thicker. The thin film process is a process by which an insulating material such as a silicon oxide layer, is deposited by chemical vapor deposition (CVD) and the first and second insulating layers are formed to be thinner. In the thick film process, a large-sized display can be easily manufactured, mass production can be achieved, and costs can be reduced. On the other hand, it is difficult to manufacture a fine FED having a high integration. Meanwhile, the thin film process has the opposite advantages and disadvantages to the advantages and disadvantages of the aforementioned thick film process.

Figure 7A:
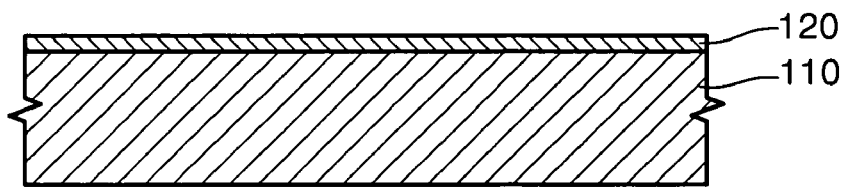
FIGS. 7A through 7H are cross-sectional views illustrating a method of manufacturing the FED shown in FIG. 4, according to the present invention.

FIG. 7A illustrates a condition where a cathode layer 120 is formed on a substrate 110. Here, a transparent glass substrate is used as the substrate 110 for rear side exposure which will be described later. Also, for this reason, the cathode layer 120 is formed of indium tin oxide (ITO) which is a transparent conductive material. Specifically, ITO is deposited on the glass substrate 120 to a predetermined thickness, i.e., a thickness of 800–2000 Å, and is patterned as a predetermined shape, i.e., a stripe shape. In this case, patterning of the cathode layer 120 may be performed by patterning of a material layer such as coating of a photoresist, formation of an etch mask by exposure and development, and etching of the cathode layer 120 using an etch mask.

Figure 7B:
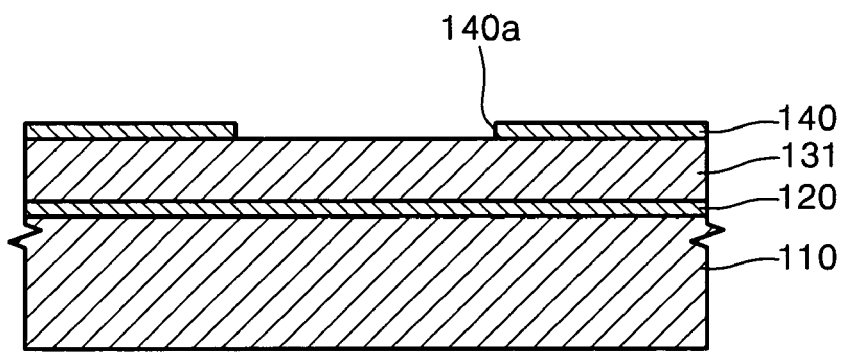

Next, as shown in FIG. 7B, a first insulating layer 131 is formed on the entire surface of the cathode layer 120 and the substrate 110 to a predetermined thickness. When the first insulating layer 131 is formed using a thick film process, an insulating material in a paste state is coated to a predetermined thickness by screen printing and is plasticized at a temperature of about 550° C. or more, thereby forming the first insulating layer 131 having a thickness of about 10–12 μm. In this case, a plasticity temperature may be varied by the type of insulating material. Meanwhile, when the first insulating layer 131 is formed using the thin film process, an insulating layer such as a silicon oxide layer is deposited to a thickness of about 1–1.5 μm by chemical vapor deposition (CVD), thereby forming the first insulating layer 131.

Subsequently, a first gate layer 140 is formed on the first insulating layer 131. A conductive metal, i.e., chrome (Cr) is deposited on the first insulating layer 131 to a thickness of about 2500–3000 Å by sputtering and is patterned as a predetermined shape, thereby forming the first gate layer 140. In this case, the first gate hole 140a having a predetermined diameter is formed on the first gate layer 140. The first gate hole 140a is formed on a portion where the cavity (170 of FIG. 7D) which will be described later, is to be formed, to a diameter greater than that of the cavity 170. For example, the diameter of the first gate hole 140a is about 30–40 μm when the first insulating layer 131 is formed using the thick film process. Also, when the first insulating layer 131 is formed using the thin film process, the diameter of the first gate hole 140a is about 5–10 μm. Patterning of the first gate layer 140 may be performed by patterning of a material layer as described previously.

Figure 7C:
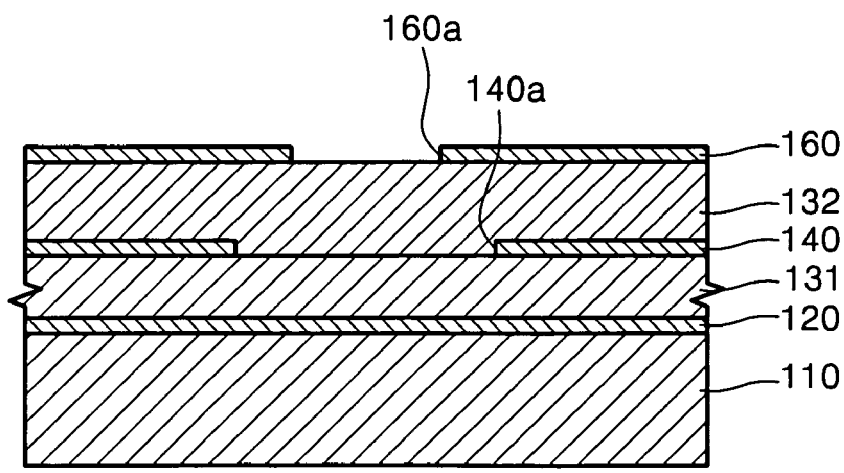

FIG. 7C illustrates a condition where a second insulating layer 132 and a second gate layer 160 are sequentially stacked on the first insulating layer 131 and the first gate layer 140. The second insulating layer 132 may be formed by the same method as forming of the first insulating layer 131. When the second insulating layer 132 is formed using the thick film process, the second insulating layer 132 is formed to a thickness of about 30–40 μm, and when the second insulating layer 132 is formed using the thin film process, the second insulating layer 132 is formed to a thickness of about 1–1.5 μm.

Subsequently, the second gate layer 160 is formed on the second insulating layer 132. Specifically, a conductive metal, i.e., chrome (Cr) is deposited on the second insulating layer 132 to a thickness of about 2500–3000 Å by sputtering, thereby forming the second gate layer 160. Next, the second gate layer 160 is patterned so that a second gate hole 160*a* is formed on a portion where the cavity (170 of FIG. 7D) which will be described later, is to be formed, to the same diameter as that of the cavity 170. For example, the diameters of the second gate hole 160*a* are about 25–30 μm when the first and second insulating layers 131 and 132 are formed using the thick film process. Also, when the first and second insulating layers 131 and 132 are formed using the thin film process, the diameters of the second gate hole 160*a* are about 3–5 μm. Patterning of the second gate layer 160 may be performed by patterning of a material layer as described previously.

Figure 7D:
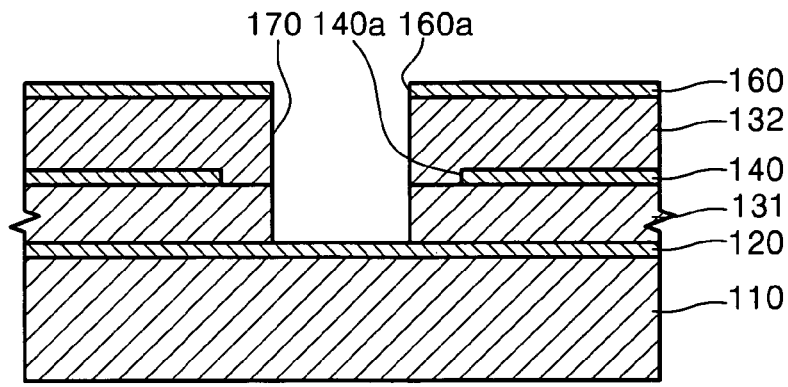

Next, as shown in FIG. 7D, the second insulating layer 132 exposed through the second gate hole 160*a* of the second gate layer 160 and the first insulating layer 131 under the second insulating layer 132 are dry or wet etched until the cathode layer 120 is exposed, thereby forming the cavity 170. In this case, the second gate layer 160 is used as an etch mask, and thus, the cavity has the same diameter as the second gate hole 160*a*. Thus, the first gate layer 140 having the first gate hole 140*a* having a diameter greater than that of the cavity 170 is not exposed to an inner surface of the cavity 170 and is completely blocked with the cavity 170 by the first and second insulating layers 131 and 132.

Figure 7E:
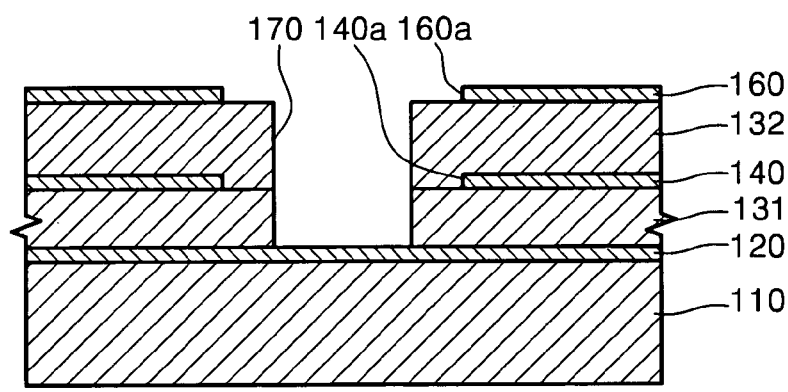

Next, as shown in FIG. 7E, the second gate layer 160 is patterned as a predetermined electrode pattern. In this case, the diameter of the second gate hole 160*a* may be enlarged to be greater than that of the cavity 170, preferably, may be the same as that of the first gate hole 140*a*.

Figure 7F:
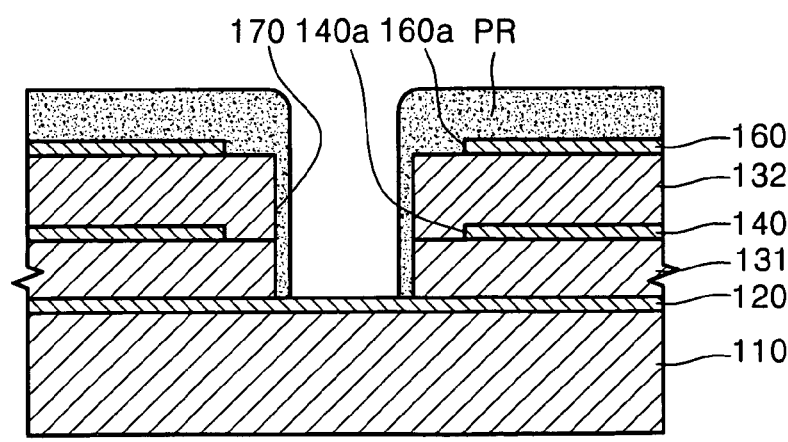
Figure 7G:
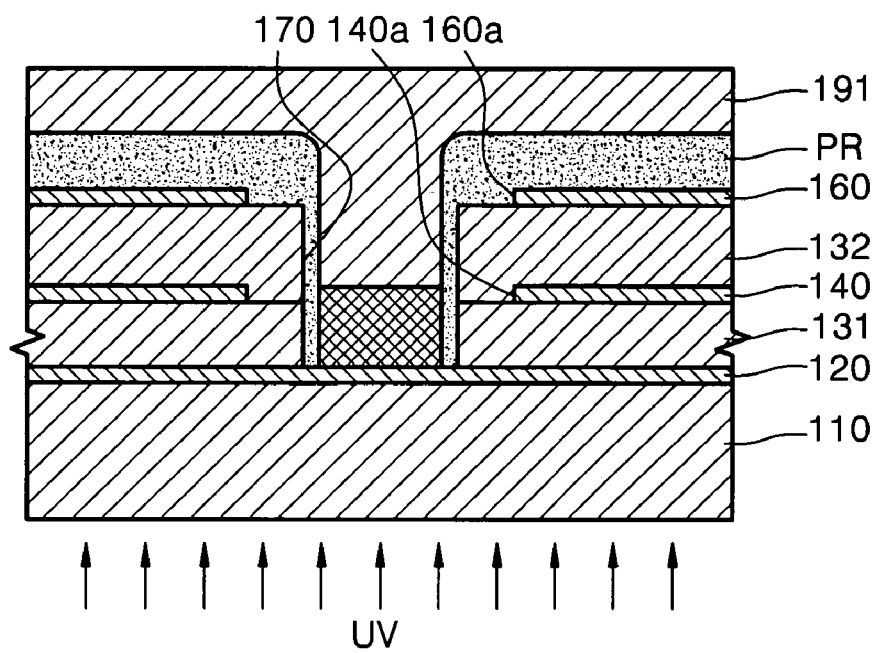
Figure 7H:
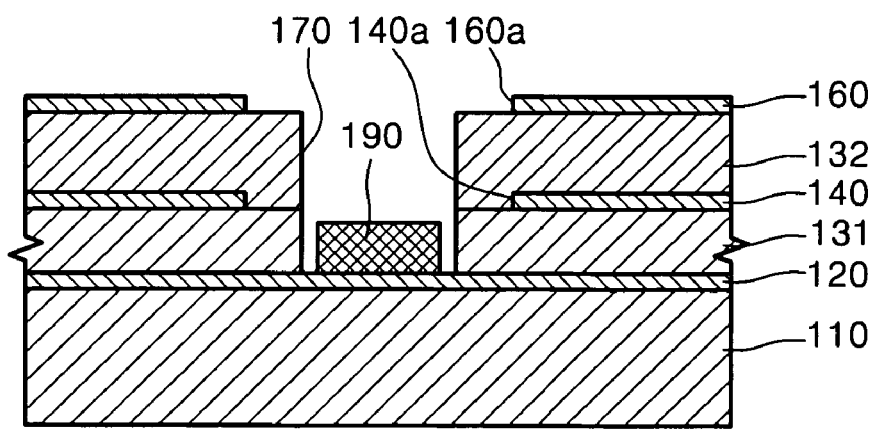

The next step is the step of forming a carbon nanotube (CNT) emitter as a field emitter 190 in the cavity 170, as shown in FIGS. 7F through 7H.

First, referring to FIG. 7F, a photoresist (PR) is coated on the entire surface of the resultant of FIG. 7E and is patterned so that part of the cathode layer 120 is exposed to the bottom surface of the cavity 170.

Subsequently, as shown in FIG. 7G, a CNT paste 191 with photosensitivity is coated on the entire surface of the resultant of FIG. 7F by screen printing. The CNT paste 191 is selectively exposed by radiating ultraviolet (UV) lays on the rear side of the substrate 110. In this case, only a portion exposed by the photoresist (PR) pattern of the CNT paste 191 is exposed and cured. The exposure depth of the CNT paste 191 can be adjusted by controlling an exposure amount.

Next, referring to FIG. 7H, if the PR pattern is removed using a developing agent such as acetone, the unexposed CNT paste 191 is removed together with removing the PR pattern, and only the exposed CNT paste 191 remains, thereby forming a CNT emitter 190. Subsequently, if a plasticity process is performed at a predetermined temperature, i.e., at a temperature of about 460° C., the CNT emitter 190 is plasticized, and simultaneously is contracted, and thus has a desired height. In this case, the plasticity temperature may be varied by the type and component of a CNT paste. When the first and second insulating layers 131 and 132 are formed using the thick film process, the height of the CNT emitter 190 is about 2–4 μm, and when the first and second insulating layers 131 and 132 are formed using the thin film process, the height of the CNT emitter 190 is about 0.5–1 μm.

As a result, as shown in FIG. 7H, the FED according to the present invention with a double gate structure in which the first gate layer 140 is formed in the insulating layers 131 and 132 is manufactured.

As described above, in the field emission display (FED) according to the present invention, a first gate layer is disposed in an insulating layer and is not exposed to an inner surface of a cavity, such that short circuit between the first gate layer and a second gate layer and between the first gate layer and a field emitter can be prevented. Thus, defects of the FED caused by short circuit are suppressed, and the life span of the FED can be increased.

In the method of manufacturing the FED according to the present invention, the above FED can be manufactured to be suitable for its use using a thick film process or a thin film process.

While this invention has been particularly shown and described with reference to preferred embodiments thereof, it will be understood by those skilled in the art that various changes in form and details may be made therein without departing from the spirit and scope thereof as defined by the appended claims.

What is claimed is:

1. A method of manufacturing a field emission display, the method comprising:
    (a) forming a transparent cathode layer on a transparent substrate;
    (b) forming a first insulating layer on the substrate and the cathode layer;
    (c) forming a first gate layer having a first gate hole on the first insulating layer;
    (d) forming a second insulating layer on the first insulating layer and the first gate layer;
    (e) forming a second gate layer having a second gate hole having a diameter smaller than that of the first gate hole on the second insulating layer;
    (f) etching the second insulating layer exposed through the second gate hole and the first insulating layer under the second insulating layer and forming a cavity through which part of the cathode layer is exposed and none of the first gate layer is exposed;
    (g) patterning the second gate layer as a predetermined shape; and
    (h) forming a field emitter on the cathode layer exposed to the bottom of the cavity.

2. The method of claim 1, wherein in (a), an indium tin oxide (ITO) material layer is formed on the transparent substrate and is patterned as a stripe shape, thereby forming the cathode layer.

3. The method of claim 1, wherein an insulating material in a paste state is coated by screen printing and is plasticized, thereby forming the first and second insulating layers.

4. The method of claim 1, wherein the first and second insulating layers are formed by chemical vapor deposition (CVD).

5. The method of wherein 1, wherein (c) comprises:
    depositing a conductive metal material on the first insulating layer and forming the first gate layer; and
    patterning the first gate layer as a predetermined shape and forming a first gate hole having a diameter greater than that of the cavity.

6. The method of claim 1, wherein (e) comprises:
    depositing a conductive metal material on the second insulating layer and forming the second gate layer; and
    forming the second gate hole to the same diameter as that of the cavity on the second gate layer.

7. The method of claim 5, wherein depositing of the conductive metal material is performed by sputtering.

8. The method of claim 6, wherein depositing of the conductive metal material is performed by sputtering.

9. The method of claim 1, wherein in (f), the second insulating layer and the first insulating layer are etched using the second gate layer as an etch mask, thereby forming the cavity to substantially the same diameter as that of the second gate hole.

10. The method of claim 1, wherein in (g), the diameter of the second gate hole is enlarged to be greater than that of the cavity.

11. The method of claim 10, wherein the diameter of the second gate hole is enlarged to be substantially the same as that of the first gate hole.

12. A method of manufacturing a field emission display, the method comprising:
(a) forming a transparent cathode layer on a transparent substrate;
(b) forming a first insulating layer on the substrate and the cathode layer;
(c) forming a first gate layer having a first gate hole on the first insulating layer;
(d) forming a second insulating layer on the first insulating layer and the first gate layer;
(e) forming a second gate layer having a second gate hole having a diameter smaller than that of the first gate hole on the second insulating layer;
(f) etching the second insulating layer exposed through the second gate hole and the first insulating layer under the second insulating layer and forming a cavity through which part of the cathode layer is exposed;
(g) patterning the second gate layer as a predetermined shape; and
(h) forming a field emitter on the cathode layer exposed to the bottom of the cavity,
wherein (h) comprises:
coating a photoresist on the entire surface of the substrate and patterning the photoresist so that part of the cathode layer is exposed to the bottom surface of the cavity;
coating a carbon nanotube (CNT) paste with photosensitivity on the entire surface of the substrate on which the photoresist is coated;
selectively exposing the CNT paste by radiating ultraviolet (UV) rays on the rear side of the substrate;
removing the photoresist using a developing agent and lifting off an unexposed portion of the CNT paste; and
plasticizing the remaining the CNT paste and forming a carbon nanotube (CNT) emitter.

13. The method of claim 12, wherein in (a), an indium tin oxide (ITO) material layer is formed on the transparent substrate and is patterned as a stripe shape, thereby forming the cathode layer.

14. The method of claim 12, wherein an insulating material in a paste state is coated by screen printing and is plasticized, thereby forming the first and second insulating layers.

15. The method of claim 12, wherein the first and second insulating layers are formed by chemical vapor deposition (CVD).

16. The method of claim 12, wherein (c) comprises:
depositing a conductive metal material on the first insulating layer and forming the first gate layer; and
patterning the first gate layer as a predetermined shape and forming a first gate hole having a diameter greater than that of the cavity.

17. The method of claim 16, wherein depositing of the conductive metal material is performed by sputtering.

18. The method of claim 12, wherein (e) comprises:
depositing a conductive metal material on the second insulating layer and forming the second gate layer; and
forming the second gate hole to the same diameter as that of the cavity on the second gate layer.

19. The method of claim 12, wherein in (f), the second insulating layer and the first insulating layer are etched using the second gate layer as an etch mask, thereby forming the cavity to substantially the same diameter as that of the second gate hole.

20. The method of claim 12, wherein in (g), the diameter of the second gate hole is enlarged to be greater than that of the cavity.

* * * * *